United States Patent
Royyuru

(10) Patent No.: US 8,688,604 B2
(45) Date of Patent: Apr. 1, 2014

(54) SYSTEMS AND METHODS FOR FACILITATING COMMUNICATION BETWEEN A POINT OF SALE DEVICE AND A CONSUMER DEVICE

(71) Applicant: First Data Corporation, Greenwood Village, CO (US)

(72) Inventor: Vijay Kumar Royyuru, Norristown, PA (US)

(73) Assignee: First Data Corporation, Greenwood Village, CO (US)

( * ) Notice: Subject to any disclaimer, the term of this patent is extended or adjusted under 35 U.S.C. 154(b) by 0 days.

(21) Appl. No.: 13/627,665

(22) Filed: Sep. 26, 2012

(65) Prior Publication Data

US 2013/0080273 A1   Mar. 28, 2013

Related U.S. Application Data

(60) Provisional application No. 61/539,206, filed on Sep. 26, 2011.

(51) Int. Cl.
*G06Q 20/00* (2012.01)
*G06Q 20/32* (2012.01)

(52) U.S. Cl.
CPC ................. *G06Q 20/3278* (2013.01)
USPC .......................................................... 706/16

(58) Field of Classification Search
CPC ................................................ G06Q 20/3278
USPC ........................................................... 705/16
See application file for complete search history.

(56) References Cited

U.S. PATENT DOCUMENTS

| | | | |
|---|---|---|---|
| 5,566,327 A | 10/1996 | Sehr | |
| 6,505,772 B1 | 1/2003 | Mollett et al. | |
| 7,119,659 B2 * | 10/2006 | Bonalle et al. | 340/5.61 |
| 8,332,272 B2 * | 12/2012 | Fisher | 705/16 |
| 8,485,441 B2 | 7/2013 | Brooks | |
| 2002/0062249 A1 | 5/2002 | Iannacci | |
| 2004/0015435 A1 | 1/2004 | Solomon et al. | |
| 2004/0049452 A1 | 3/2004 | Blagg | |

(Continued)

OTHER PUBLICATIONS

DigiMo pioneers first true mobile payment solution; mobile payment breakthrough requires no software or hardware change to point-of-sale or mobile devices, ensuring rapid deployment at minimal cost. May 5, 2011. M2 Presswire.*

(Continued)

*Primary Examiner* — Scott Zare
(74) *Attorney, Agent, or Firm* — Sutherland Asbill & Brennan LLP

(57) ABSTRACT

Embodiments of the disclosure can include systems and methods for facilitating communication between a point of sale device and a consumer device. In one embodiment, a computer-implemented method for communicating with a consumer device at a point of sale (POS) can be provided. The method can include establishing, by a merchant POS device, communication with the consumer device at the point of sale; collecting, by the merchant POS device, transaction-related information from a payment application associated with the consumer device; determining, by the merchant POS device, that the collected transaction-related information does not include both payment-related information and value added services (VAS) information associated with one or more VAS; and collecting, by the merchant POS device based at least in part upon the determination, second transaction-related information from a second payment application associated with the consumer device.

12 Claims, 3 Drawing Sheets

(56) References Cited

U.S. PATENT DOCUMENTS

| | | |
|---|---|---|
| 2005/0077350 A1 | 4/2005 | Courtion et al. |
| 2006/0000900 A1 | 1/2006 | Fernandes et al. |
| 2006/0208060 A1 | 9/2006 | Mendelovich et al. |
| 2006/0229974 A1 | 10/2006 | Keithley et al. |
| 2006/0242046 A1 | 10/2006 | Haggerty et al. |
| 2007/0203832 A1 | 8/2007 | Babi et al. |
| 2008/0203153 A1 | 8/2008 | Keithley et al. |
| 2008/0208760 A1 | 8/2008 | Keithley |
| 2009/0144165 A1 | 6/2009 | Dickelman |
| 2009/0164320 A1 | 6/2009 | Galit |
| 2010/0070354 A1 | 3/2010 | Fordyce et al. |
| 2011/0078081 A1* | 3/2011 | Pirzadeh et al. ............... 705/44 |
| 2012/0109764 A1* | 5/2012 | Martin et al. ................. 705/17 |
| 2012/0143703 A1* | 6/2012 | Wall et al. ..................... 705/16 |
| 2012/0296770 A1* | 11/2012 | Lin et al. ..................... 705/26.8 |
| 2013/0040571 A1* | 2/2013 | Wall et al. ................... 455/41.1 |
| 2013/0046643 A1* | 2/2013 | Wall et al. ..................... 705/16 |
| 2013/0080239 A1 | 3/2013 | Okerlund |

OTHER PUBLICATIONS

Non-final Office Action for U.S. Appl. No. 13/627,654 mailed Apr. 2, 2013.

Final Office Action for U.S. Appl. No. 13/627,654 mailed Sep. 9, 2013.

Non-Final Office Action for U.S. Appl. No. 13/627,654 mailed Jan. 2, 2014.

* cited by examiner

SYSTEMS AND METHODS FOR FACILITATING COMMUNICATION BETWEEN A POINT OF SALE DEVICE AND A CONSUMER DEVICE

RELATED APPLICATION

This application claims priority to U.S. Ser. No. 61/539,206, titled "Systems and Methods for Processing Payment Transactions," filed on Sep. 26, 2011, the contents of which are incorporated herein by reference.

FIELD OF THE DISCLOSURE

Embodiments of the disclosure relate generally to point of sale transactions, and more specifically to the communication between a merchant point of sale device and a consumer device during a point of sale transaction.

BACKGROUND OF THE DISCLOSURE

A purchase transaction at a point of sale ("POS") typically involves a wide variety of different operations and/or communications. For example, a consumer payment device (e.g., a payment card, etc.) is typically scanned or read in order to provide payment account information to a merchant terminal. Additionally, bar-coded loyalty cards and/or bar-coded coupons are typically scanned prior to a payment transaction. Following a payment transaction, a receipt is typically printed and provided to a consumer. Additionally, coupons are typically printed for later use by the consumer. Indeed, a wide variety of different operations may be performed.

Increasingly, a wide variety of consumer devices are being utilized in association with POS payment transactions. For example, a consumer can utilize a smart card, mobile device, or contactless payment device to interact with a merchant device (e.g., a POS reader device, etc.) in conjunction with a payment transaction. However, the exchange of data in association with a payment transaction typically involves a wide variety of different operations. For example, a coupon may be displayed on the screen of a mobile device and scanned at a POS register. Payment account information may then be communicated to the merchant terminal in a separate communication, and a receipt may be returned in another communication. These various communications may be relatively time consuming and cumbersome for both a consumer and a merchant. Accordingly, there is an opportunity for improved systems and methods for communicating transaction-related information between a consumer device and a merchant device.

SUMMARY

Embodiments of the disclosure can include systems and methods for facilitating communication between a point of sale device and a consumer device. Certain embodiments can facilitate communication between a merchant point of sale device and a consumer device during a point of sale transaction. In one embodiment, a computer-implemented method for communicating with a consumer device at a point of sale ("POS") can be provided. The method can include establishing, by a merchant POS device, communication with the consumer device at the point of sale; collecting, by the merchant POS device, transaction-related information from a payment application associated with the consumer device; determining, by the merchant POS device, that the collected transaction-related information does not include both payment-related information and value added services ("VAS") information associated with one or more VAS; and collecting, by the merchant POS device based at least in part upon the determination, second transaction-related information from a second payment application associated with the consumer device.

In one aspect of an embodiment, the merchant POS device can include at least one of a merchant POS terminal or a merchant POS reader device.

In one aspect of an embodiment, determining that the collected transaction-related information does not include both payment-related information and VAS information can include determining, by the merchant POS device, an identifier of the payment application; comparing, by the merchant POS device, the identifier to a list of applications that support single tap functionality; and determining, by the merchant POS device based at least in part upon the comparison, that the collected transaction-related information does not include both payment-related information and VAS information.

In one aspect of an embodiment, the computer-implemented method can further comprise outputting, by the merchant POS device based at least in part upon the collection of information from the second payment application, an indication of a successful read of the consumer device.

In another embodiment, a system for communicating with a consumer device at a point of sale ("POS") can be provided. The system can include at least one memory configured to store computer-executable instructions; and at least one processor configured to access the at least one memory and execute the computer-executable instructions. The computer-executable instructions can be operable to establish communication with the consumer device at the point of sale; collect transaction-related information from a payment application associated with the consumer device; determine that the collected transaction-related information does not include both payment-related information and value added services ("VAS") information associated with one or more VAS; and collect, based at least in part upon the determination, second transaction-related information from a second payment application associated with the consumer device.

In one aspect of an embodiment, the computer-executable instructions to establish communication with a consumer device at the point of sale are initiated by a merchant POS device including at least one of a merchant POS terminal or a merchant POS reader device.

In one aspect of an embodiment, the computer-executable instructions to determine that the collected transaction-related information does not include both payment-related information and VAS information can include computer-executable instructions to: determine an identifier of the payment application; compare the identifier to a list of applications that support single tap functionality; and determine, by the merchant POS device based at least in part upon the comparison, that the collected transaction-related information does not include both payment-related information and VAS information.

In one aspect of an embodiment, the computer-executable instructions can further include computer-executable instructions operable to output, based at least in part upon the collection of information from the second payment application, an indication of a successful read of the consumer device.

In yet another embodiment, a method for communicating with a consumer device at a point of sale ("POS") can be provided. The method can include establishing communication with the consumer device at the point of sale; collecting transaction-related information from a payment application associated with the consumer device; determining that the collected transaction-related information does not include both payment-related information and value added services ("VAS") information associated with one or more VAS; and collecting, based at least in part upon the determination, second transaction-related information from a second payment application associated with the consumer device.

In one aspect of an embodiment, some or all of the operations are executed by a merchant POS device including at least one of a merchant POS terminal or a merchant POS reader device.

In one aspect of an embodiment, determining that the collected transaction-related information does not include both payment-related information and VAS information can include determining, by the merchant POS device, an identifier of the payment application; comparing, by the merchant POS device, the identifier to a list of applications that support single tap functionality; and determining, by the merchant POS device based at least in part upon the comparison, that the collected transaction-related information does not include both payment-related information and VAS information.

In one aspect of an embodiment, the method can further include outputting, by the merchant POS device based at least in part upon the collection of information from the second payment application, an indication of a successful read of the consumer device.

DETAILED DESCRIPTION OF THE DISCLOSURE

Figure 1:
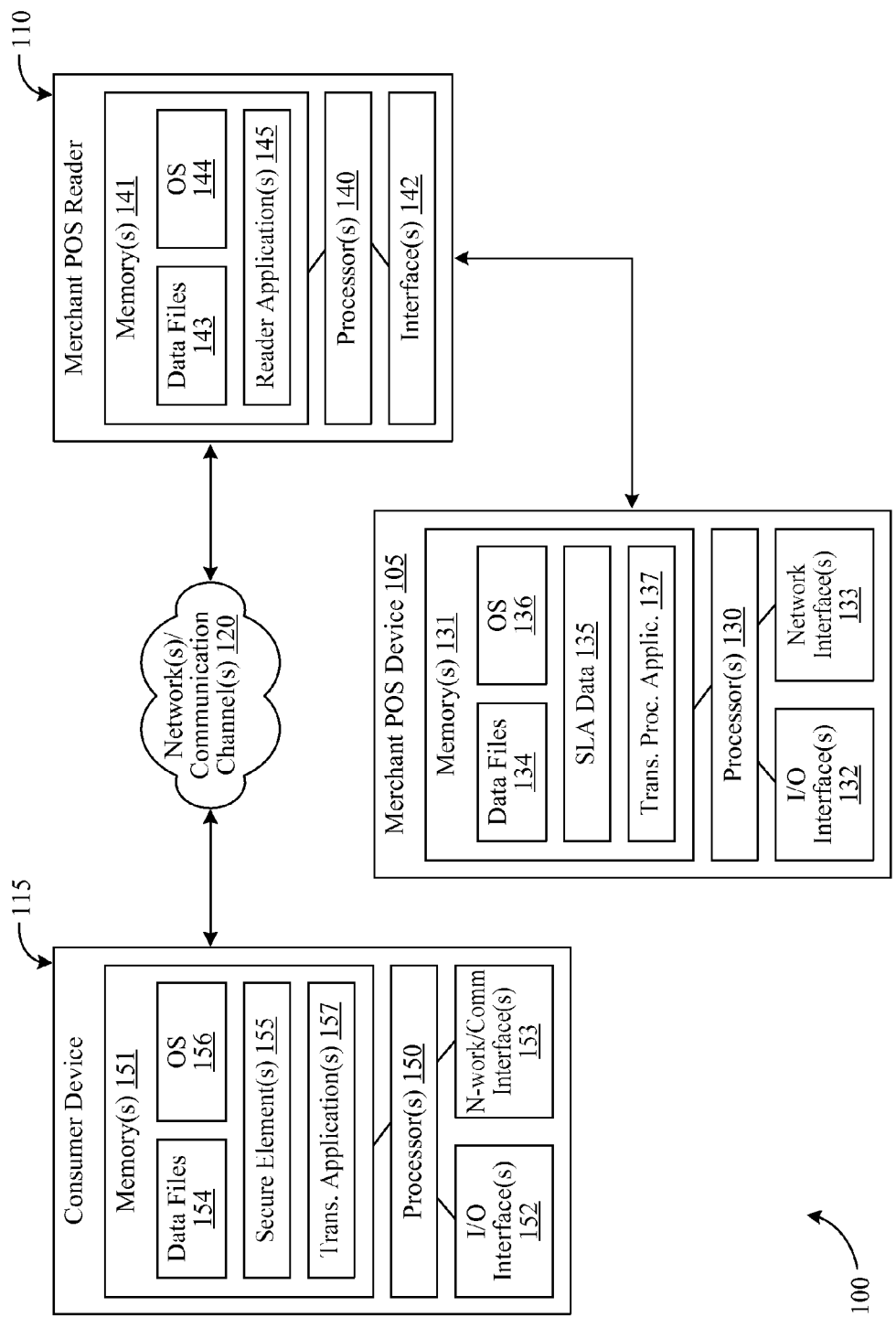
FIG. 1 illustrates a block diagram of an example system that may be utilized in accordance with various embodiments of the disclosure.

Various embodiments of the disclosure are directed to systems and methods for facilitating communication between a merchant device, such as a merchant point of sale ("POS") reader device, and a consumer device (e.g., a mobile device, a smart card, a contactless payment device, etc.). According to an aspect of the disclosure, functionality may be provided to receive relevant information from a consumer device in a single interaction (e.g., single read) between the consumer device and a merchant POS device. As desired, a wide variety of information may be received, including payment account and/or payment application information and/or various value added service ("VAS") information (e.g., coupon information, loyalty information, receipt delivery information, location-based services information, warranty information, product registration information, etc.). In this regard, the number of interactions between a consumer and a merchant during a payment transaction may be reduced, thereby enhancing the consumer experience and merchant workflow.

In one example embodiment, a merchant POS reader device, such as a radio frequency ("RF") reader device, a near field communication ("NFC") reader device, a Wi-Fi device, or a Bluetooth device, may be provided to facilitate the reading of information from a consumer device. In certain embodiments, the merchant POS reader device may be in communication with one or more additional merchant devices, such as a merchant POS terminal. In other embodiments, the reader device may be integrated into another merchant device, such as the merchant POS terminal. In either case, the reader device may be configured to identify (e.g., access from memory, receive from a POS terminal, receive from another source, etc.) a list of one or more applications that support single tap functionality. In other words, the reader device may identify one or more applications that facilitate receipt of all of the information to be utilized in association with a payment transaction (e.g., payment information, VAS information, etc.) from a consumer device.

During a payment transaction, the reader device may initiate and/or establish communication with a consumer device. During the communication, the reader device may identify and/or select a payment application associated with the consumer device that will be utilized for a payment transaction. As desired, a wide variety of rules, parameters, and/or preferences may be utilized to select the payment application. Once selected a read of the payment application may be conducted by the reader device. Following the read of the payment application, a payment application identifier may be determined, and the identifier may be compared to a list of single tap applications. In the event that the payment application is included in the list of single tap applications, then a "good" read may be acknowledged and, as desired, one or more indicators (e.g., a visual indicator, an audio indicator, etc.) may be provided to the consumer. Information associated with the payment application may then be utilized for a wide variety of transaction-related purposes, such as payment and VAS purposes. In the event that the payment application is not included in the list of single tap applications, then the reader may select and invoke one or more additional applications on the consumer device. For example, a second application associated with a VAS service provider may be invoked and information may be read from the second application. Once information is read from one or more additional applications, the reader may determine that at least one of the additional applications is included in the list of single tap applications. The reader may then identify, from the plurality of read applications, transaction-related information. For example, payment information (e.g., payment account information, etc.) read from the first application, as well as VAS information read from a second application, may be identified, and the information may be provided to a merchant POS for further processing. A "good" read may then be acknowledged.

Embodiments of the disclosure now will be described more fully hereinafter with reference to the accompanying drawings, in which embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

System Overview

FIG. 1 represents a block diagram of an example system 100 for facilitating communication between a consumer device and a point of sale device, according to one embodiment of the disclosure. In certain embodiments, the system 100 may facilitate the reading of transaction-related information from a consumer device during a "single tap" or single perceived interaction between the consumer device and a merchant reader device. As shown in FIG. 1, the system 100 may include one or more merchant devices, which may include one or more merchant POS devices (e.g., merchant POS terminals, merchant registers, merchant computers, etc.)

and/or one or more merchant POS reader devices 110. The system 100 may also include one or more consumer devices 115. As desired, the system 100 may include a wide variety of other entities associated with payment transactions, such as one or more service provider computers and/or one or more payment account issuer computers (not shown). Any number of suitable networks and/or communication channels, such as the illustrated networks 120, may facilitate communication between various components of the system 100.

With reference to FIG. 1, any number of merchant devices may be provided. In certain embodiments, these merchant devices may include one or more suitable point-of-sale ("POS") devices (e.g., a POS terminal) and/or merchant reader devices that are located at a physical merchant location. As desired, each merchant device may include any number of processor-driven devices, including but not limited to, a server computer, a mainframe computer, one or more networked computers, a desktop computer, a personal computer, a laptop computer, a mobile computer, an application-specific circuit, or any other processor-based device.

A merchant POS device 105 may be a suitable device that facilitates the completion of payment transactions. In operation, the merchant POS device 105 may utilize one or more processors 130 to execute computer-readable instructions that facilitate the processing of received transaction-related information (e.g., information associated with items to be purchased, transaction amounts, consumer payment account information, VAS information, etc.) and/or the generation and/or output of transaction-related requests (e.g., transaction authorization requests, value added service ("VAS") requests, etc.). As a result of executing these computer-readable instructions, a special purpose computer or particular machine may be formed that facilitates the completion of POS payment transactions.

In addition to having one or more processors 130, the merchant POS device 105 may further include and/or be associated with one or more memory devices 131, input/output ("I/O") interface(s) 132, and/or network interface(s) 133. The memory 131 may be any computer-readable medium, coupled to the processor(s) 130, such as random access memory ("RAM"), read-only memory ("ROM"), and/or removable storage devices. The memory 131 may store a wide variety of data files 134, a wide variety of Single-Tap List of Applications ("SLA") data 135, and/or various program modules, such as an operating system ("OS") 136 and/or one or more transaction processing applications or modules 137. The data files 134 may include any suitable data that facilitates the operation of the merchant POS device 105 and/or interaction of the merchant POS device 105 with one or more other components (e.g., one or more merchant POS readers 110, one or more service provider computers, etc.) of the system 100. For example, the data files 134 may include information associated with the merchant POS readers 110, acquiring platform information, service provider information, information associated with the generation of proposed transaction and/or VAS requests, information associated with available VAS, and/or routing information for proposed transactions.

The SLA data 135 may include information associated with one or more applications that are "single tap" applications. For example, the SLA data 135 may include information associated with a Single-Tap List of Applications. In one embodiment, the SLA data 135 may include identifiers of single tap applications, as well as information associated with one or more service providers that are configured to perform back-end processing associated with single tap applications, such as service providers configured to provide a wide variety of value added services.

The OS 136 may be a suitable module that facilitates the general operation of the merchant POS device 105, as well as the execution of other program modules. For example, the OS 136 may be, but is not limited to, Microsoft Windows®, Apple OSX™, Unix, a mainframe computer operating system (e.g., IBM z/OS, MVS, OS/390, etc.), or a specially designed operating system. The transaction processing applications or modules 137 may include any number of suitable software modules and/or applications that facilitate the receipt of transaction information (e.g., purchase transaction information, a purchase amount, information associated with purchased products, etc.), the receipt of payment account information read from a consumer device, the generation of a proposed transaction, and/or the output of the proposed transaction. In certain embodiments, the transaction processing applications 137 may additionally facilitate the identification of information associated with a wide variety of value added services and the generation of one or more requests to invoke value added services, such as requests communicated to one or more service providers. Additionally, as desired, the transaction processing applications 137 (or another suitable application) may facilitate the provision of at least a portion of the SLA data 135 (e.g., a list of single tap application identifiers, etc.) to one or more merchant POS readers 110.

In one example embodiment, a transaction processing application 137 may identify transaction information and utilize at least a portion of the transaction information to provide any number of transaction-related services. For example, the transaction processing application 137 may identify information associated with products and/or services to be purchased, as well as payment account information and/or other transaction-related information (e.g., coupon information, etc.) read from a consumer device (e.g., a transaction-enabled mobile device, a smart card, a contactless device, etc.). As desired, the transaction processing application 137 may invoke and/or request (e.g., request a service provider computer, etc.) the invocation of a wide variety of VAS associated with a transaction, such as the application of coupons, the award and/or redemption of loyalty rewards, etc. The transaction processing application 137 may then generate a proposed transaction request that is output for routing and/or delivery to a suitable transaction processor, such as a payment account issuer. In the event that the transaction is authorized, the transaction processing application 137 may invoke and/or request the invocation of a wide variety of VAS following the transaction, such as receipt delivery services, product registration services, etc. Indeed, a wide variety of suitable operations may be performed by the transaction processing application 137.

One example of the operations that may be performed by a transaction processing application 137 and/or the merchant POS device 105 is described in greater detail below with reference to FIG. 3.

With continued reference to the merchant POS device 105, the one or more I/O interfaces 132 may facilitate communication between the merchant POS device 105 and one or more input/output devices; for example, one or more user interface devices, such as a display, a keypad, a mouse, a pointing device, a control panel, a touch screen display, a remote control, a microphone, a speaker, a consumer device reader, etc., that facilitate user interaction with the merchant POS device 105. The one or more network and/or communication interfaces 133 may facilitate connection of the merchant POS device 105 to one or more suitable networks and/or communication links. In this regard, the merchant POS device 105 may receive and/or communicate information to other components of the system 100, such as the merchant POS readers 110, one or more service provider computers, and/or other devices and/or systems.

With continued reference to FIG. 1, any number of merchant POS readers 110 or reader devices may be provided. Each merchant POS reader 110 may be a suitable merchant POS device configured to facilitate communication with a consumer device 115 at a point of sale. For example, a merchant POS reader 110 may facilitate the reading of payment account information and/or other information (e.g., loyalty account information, coupon information, etc.) from a consumer device 115. A wide variety of different types of merchant POS reader 110 may be utilized as desired in various embodiments of the disclosure, including but not limited to, radio frequency readers, near field communication readers, Bluetooth readers, Wi-Fi readers, etc. In certain embodiments, a merchant POS reader 110 may be incorporated into a merchant POS device 105. In other embodiments, a merchant POS reader 110 may be in communication with the merchant POS device 105.

As desired, a merchant POS reader 110 may include any number of suitable processor-driven devices that facilitate the reading of information from a consumer device 115. Merchant POS reader 110 may be a suitable device that facilitates the completion of payment transactions. In operation, the merchant POS reader 110 may utilize one or more processors 140 to execute computer-readable instructions that facilitate reading and/or communication with consumer devices 115, the identification of read and/or invoked consumer device applications, the processing of read transaction-related information, and/or the provision of read information to a merchant POS device 105. As a result of executing these computer-readable instructions, a special purpose computer or particular machine may be formed that facilitates the reading of consumer devices 115.

In addition to having one or more processors 140, the merchant POS reader 110 may further include and/or be associated with one or more memory devices 141 and/or interface(s) 142. The memory 141 may be any computer-readable medium, coupled to the processor(s) 140, such as random access memory ("RAM"), read-only memory ("ROM"), and/or removable storage devices. The memory 141 may store a wide variety of data files 143 and/or various program modules, such as an operating system ("OS") 144, and/or one or more reader applications 145. The data files 143 may include any suitable data that facilitates the operation of the merchant POS reader 110 and/or interaction of the merchant POS reader 110 with one or more other components (e.g., a consumer device 115, the merchant POS device 105, etc.) of the system 100. For example, the data files 143 may include information associated with one or more communication protocols, identification information for the merchant POS device 105, and/or SLA information received from the merchant POS device 105. The OS 144 may be a suitable module that facilitates the general operation of the merchant POS reader 110, as well as the execution of other program modules. For example, the OS 144 may be, but is not limited to, Microsoft Windows®, Apple OSX™, or a specially designed operating system.

The reader applications or reader modules 145 may include any number of suitable software modules and/or applications that facilitate the establishment of communication with a consumer device 115 and/or the reading of information from a consumer device 115. For example, a reader application 145 may include a suitable NFC reader application, RF reader application, Bluetooth reader application, Wi-Fi reader application, or other reader application. In operation, a reader application 145 may receive information associated with single tap applications, such as SLA data, from a merchant POS device 105. The reader application 145 may then initiate and/or establish a communications session with a consumer device 115. During the initiated communications session, the reader application 145 may request and/or receive a wide variety of transaction-related and/or VAS information from the consumer device 115. For example, the reader application 145 may invoke one or more payment applications stored on the consumer device 115. Additionally, the reader application 145 may identify information associated with received information and/or invoked payment applications in order to determine whether information has been received from one or more single tap applications. In this regard, the reader application 145 may determine whether all of the information that may be utilized to provide payment services and/or VAS has been obtained from the consumer device 115. In the event that data has not been received from a single tap application, the reader application 145 may continue to invoke and/or read information from one or more additional applications stored on the consumer device 115. A "good" read will not be identified until it is determined that a single tap application has been invoked. In this regard, a consumer utilizing the consumer device 115 will perceive a single interaction (e.g., a single tap, a single read, etc.) with the merchant POS reader 110.

One example of the operations that may be performed by a reader application 145 is described in greater detail below with reference to FIG. 2.

With continued reference to the merchant POS reader 110, the one or more interfaces 142 may facilitate communication between the merchant POS reader 110 and one or more suitable networks and/or communication channels, such as the networks 120 illustrated in FIG. 1. In this regard, the merchant POS reader 110 may receive and/or communicate information to other components of the system 100, such as the consumer device 115 and/or the merchant POS device 105.

Additionally, with continued reference to FIG. 1, any number of consumer devices 115 may be provided. Examples of suitable consumer devices 115 include, but are not limited to, contactless transaction devices (e.g., transaction devices including a contactless chip, etc.), smart cards, mobile devices (e.g., mobile phones, smart phones, etc.), or the like. According to an aspect of the disclosure, a consumer device 115 may be a suitable device that is capable of interaction with a merchant POS reader in association with a payment or purchase transaction. During a purchase request, various payment account information and/or other information (e.g., loyalty information, coupon information, transaction preferences, etc.) may be provided to a merchant POS reader 110 by the consumer device 115.

As desired, a consumer device 115 may include any number of processor-driven devices, including but not limited to, a mobile computer, an application-specific circuit, a minicomputer, a microcontroller, and/or any other processor-based device. A consumer device 115 may utilize one or more processors 150 to execute computer-readable instructions that facilitate the general operation of the consumer device 115 (e.g., call functionality, etc.) and/or communication with a merchant POS reader 110 for payment transaction purposes. As a result of executing these computer-readable instructions, a special purpose computer or particular machine may be formed that facilitates the provision of transaction-related services on behalf of a consumer.

In addition to having one or more processors 150, the consumer device 115 may further include and/or be associated with one or more memory devices 151, input/output ("I/O") interface(s) 152, and/or network interface(s) 153. The memory 151 may be any computer-readable medium, coupled to the processor(s) 150, such as random access memory ("RAM"), read-only memory ("ROM"), and/or removable storage devices. The memory 151 may store a wide variety of data files 154 and/or various program modules, such as an operating system ("OS") 156 and/or one or more transaction applications or modules 157. In certain embodiments, a consumer device 115 may include one or more secure elements 155 configured to securely store and/or access information, such as payment applications, payment account information, and/or other transaction-related information. The secure elements 155 may be stored in the memory 151 and/or included as a separate component of the consumer device 115. For example, a secure element 155 may be a separate chip that is configured to communicate with primary computing functionality for the consumer device 115. As desired, one or more of the transaction applications 157 may be stored on a secure element 155. These transaction applications 157 may be invoked by other components of the consumer device 115 and/or by a merchant POS reader 110.

The data files 154 may include any suitable data that facilitates the operation of the consumer device 115 and/or interaction of the consumer device 115 with one or more other components (e.g., a merchant POS reader 110, a service provider computer, etc.) of the system 100. For example, the data files 154 may include information associated with accessing the secure elements 155, information associated with invoking transaction applications 157, and/or information that facilitates interaction with merchant POS readers 110. The OS 156 may be a suitable module that facilitates the general operation of the consumer device 115, as well as the execution of other program modules. For example, the OS 156 may be, but is not limited to, a suitable mobile OS or a specially designed operating system. As desired, the consumer device 115 may additionally include one or more communication modules that facilitate interaction with merchant POS readers 110. For example, a suitable near field communication module, radio frequency module, Bluetooth module, or other suitable communication module may be utilized.

The transaction applications 157 may include one or more suitable software modules and/or applications configured to interact with a merchant POS reader 110 in conjunction with a payment transaction. In one example operation, a transaction application 157 may be invoked by a merchant POS reader 110 or alternatively, a transaction application 157 may initiate communication with a merchant POS reader 110. As desired, a consumer PIN or other consumer authentication mechanism may be initiated in order to verify the identity of the consumer. Additionally, each transaction application 157 may provide a wide variety of transaction-related information to the merchant POS reader 110, such as payment account information, payment device identification information (e.g., a mobile telephone number, etc.), consumer identification information, etc. As desired, a transaction application 157 may additionally provide a wide variety of VAS information to the merchant POS reader 110, such as consumer identification information, consumer device identification information, coupons and/or offers to be redeemed, loyalty information (e.g., a loyalty account number, if available), electronic receipt preferences, warranty preferences, product registration preferences, etc. A proposed transaction may be generated and/or processed by a merchant POS device 105 and, in certain embodiments, a wide variety of information (e.g., electronic receipts, warranty information, product registration information, etc.) may be returned to the transaction application 157 for storage and/or presentation to the consumer. In certain embodiments, the merchant POS device 105 may communicate with a service provider computer, an acquiring platform, an issuer system, and/or other devices in order to facilitate the back-end processing of a transaction (e.g., authorization, settlement, value added services, etc.). In other embodiments, the consumer device 115 and/or the transaction application 157 may communicate with one or more of these entities in conjunction with transaction processing. For example, the transaction application 157 may provide payment account information to a service provider computer rather than to the merchant POS device 105. Indeed, a wide variety of different transaction processing flows and/or methods may be utilized as desired in various embodiments.

According to an aspect of the disclosure, certain transaction applications 157 may be single tap applications that include a wide variety of information that may be utilized in association with a payment transaction, such as payment account information and VAS information. Other transaction applications 157 may only include payment-related information. In other words, some transaction applications 157 may not include VAS information. In the event that a non-single tap application is utilized to provide only payment-related information, at least one single tap application may additionally be utilized by the consumer device 115 and/or invoked by the merchant POS reader 110 to provide other information, such as VAS information, to the merchant POS reader 110.

The one or more I/O interfaces 152 may facilitate communication between the consumer device 110 and one or more input/output devices; for example, one or more user interface devices, such as a display, a keypad, a touch screen display, a microphone, a speaker, etc., that facilitate user interaction with the consumer device 115. The one or more network and/or communication interfaces 153 may facilitate connection of the consumer device 115 to one or more suitable networks, for example, the network(s) 120 illustrated in FIG. 1. In this regard, the consumer device 115 may receive and/or communicate information to other components of the system 100.

Although not illustrated in FIG. 1, any number of service provider computers may be utilized as desired in various embodiments of the disclosure. A service provider computer may provide a wide variety of transaction-related and/or value added services ("VAS") in association with transactions, such as coupon redemption services, loyalty services, location-based services, electronic receipt services, product registration services, warranty services, coupon issuance services, and/or the routing of a proposed transaction to an issuer for approval and/or settlement purposes. In certain embodiments, a service provider computer may include similar components as those discussed above for the merchant POS device 105. For example, a service provider computer may include any number of processors, memories, I/O interfaces, and/or network/communication interfaces.

Although not illustrated in FIG. 1, as desired in various embodiments, any number of issuer and/or financial institution systems may be provided. An issuer system may facilitate the backend processing of a proposed transaction. For example, an issuer system may facilitate the approval and/or settlement of a proposed transaction. In certain embodiments, a proposed transaction may be routed to an issuer system via a suitable transaction network (e.g., a debit network, a credit network, etc.), and the issuer system may evaluate the proposed transaction. An approval or rejection of the proposed transaction may then be output for communication to a merchant POS device 105. The issuer system may then facilitate the settlement of the proposed transaction.

A wide variety of suitable networks and/or communication channels 120 may be utilized in association with embodiments of the disclosure. Certain networks and/or channels 120 may facilitate communication between consumer devices 115 and merchant POS readers 110. These networks 120 may include wireless networks, RF networks, Bluetooth-enabled networks, NFC connections, etc. Other networks may facilitate communication between remote devices. For example, one or more telecommunication networks, cellular networks, wide area networks (e.g., the Internet) and/or transaction networks (e.g., branded networks (e.g., a VISA network, etc.), debit and/or PIN networks, and/or a wide variety of other suitable transaction networks) may facilitate communication between various components of the system 100. Due to network connectivity, various methodologies as described herein may be practiced in the context of distributed computing environments. It will also be appreciated that the various networks may include a plurality of networks, each with devices such as gateways and routers for providing connectivity between or among networks. Additionally, instead of, or in addition to, a network, dedicated communication links may be used to connect various devices in accordance with an example embodiment.

The system 100 shown in and described with respect to FIG. 1 is provided by way of example only. Numerous other operating environments, system architectures, and device configurations are possible. Other system embodiments can include fewer or greater numbers of components and may incorporate some or all of the functionality described with respect to the system components shown in FIG. 1. Accordingly, embodiments of the disclosure should not be construed as being limited to any particular operating environment, system architecture, or device configuration.

Operational Overview

Figure 2:
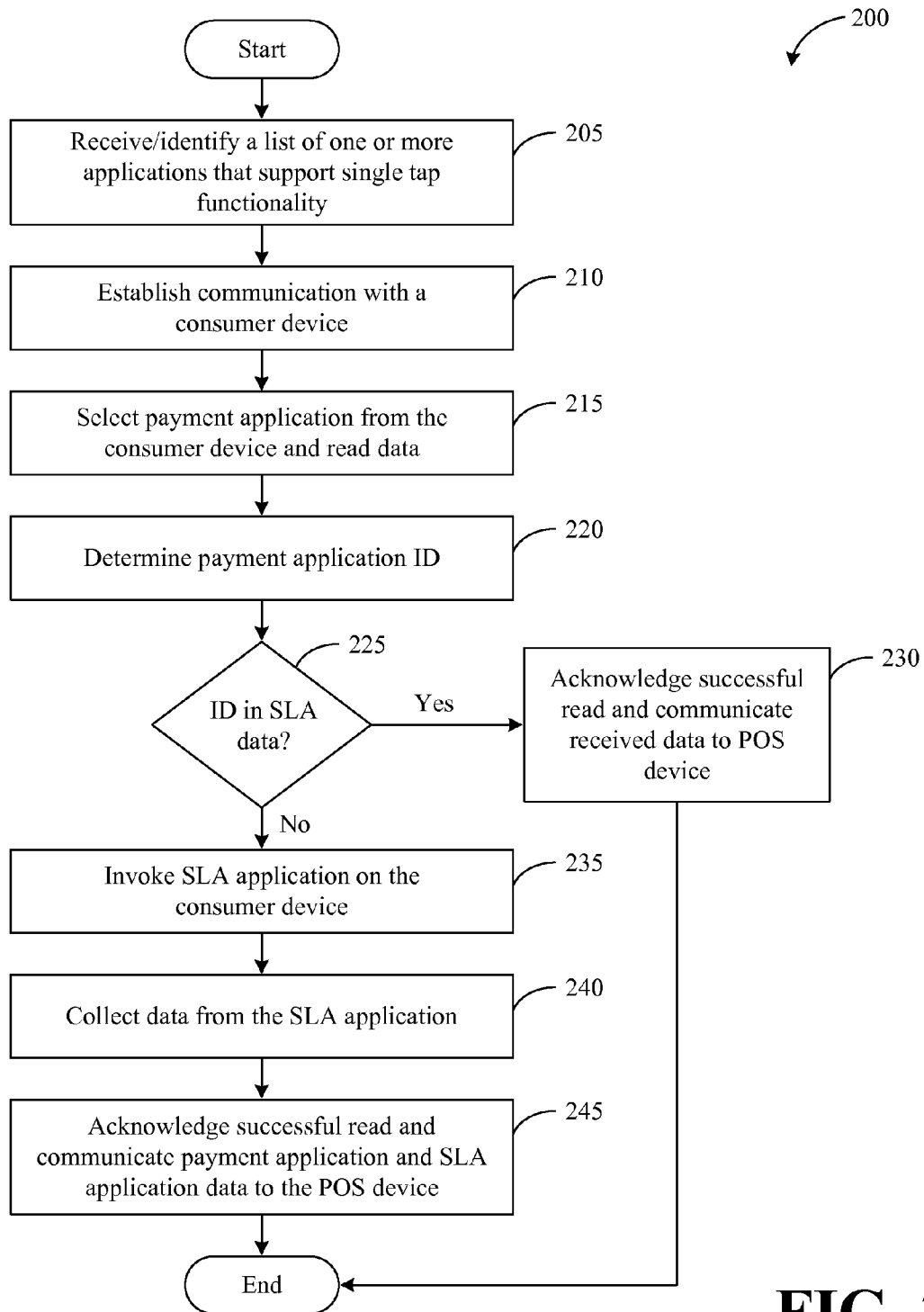
FIG. 2 illustrates a flow diagram of an example process for communicating with a consumer device, according to an example embodiment of the disclosure.

FIG. 2 illustrates a flow diagram of an example method 200 for communicating with a consumer device, according to an example embodiment of the disclosure. In certain embodiments, the operations of the method 200 may be performed by a suitable merchant POS reader, such as the merchant POS reader 110 illustrated in FIG. 1. The method 200 may begin at block 205.

At block 205, one or more applications that support single tap functionality may be identified. For example, a Single-Tap List of Applications ("SLA") may be identified. The SLA data may include a wide variety of suitable information, such as names and/or identifiers of single tap applications. In certain embodiments, the SLA information may be received by the merchant POS reader 110 from a suitable merchant POS device, such as the POS device 105 illustrated in FIG. 1. As desired, received SLA information may be stored for subsequent access.

At block 210, communication between the merchant POS reader 110 and a consumer device, such as the consumer device 115 illustrated in FIG. 1, may be established. For example, communication between the merchant POS reader 110 and the consumer device 115 in conjunction with a payment transaction (e.g., a checkout payment transaction at a point of sale, etc.) may be established. A wide variety of suitable communication techniques may be utilized as desired to establish communication, including but not limited to, radio frequency ("RF") communications, near field communication ("NFC"), Bluetooth communication, Wi-Fi communication, etc. In certain embodiments, a consumer may be instructed or invited to hold the consumer device 115 at or within a desired distance from the merchant POS reader 110 to facilitate the communication. Additionally, the consumer may be instructed to maintain the consumer device 115 at or within the desired distance until a "good" read indication (e.g., a visual indicator, an audio indicator, etc.) is presented to the consumer.

At block 215, a payment application may be selected from the consumer device 115 and data associated with the selected payment application may be read from the payment application. A wide variety of suitable methods and/or techniques may be utilized as desired to select a payment application for reading. For example, a payment application that has been invoked by the consumer on the consumer device 115 (e.g., a merchant-specific payment application, a credit card payment application, etc.) may be identified and selected. As another example, one or more predetermined rules may be utilized to identify stored payment application and an appropriate application may be selected and/or invoked based at least in part upon an evaluation of the one or more rules.

Additionally, a wide variety of different types of information may be read from the consumer device 115 in association with the selected payment application. This information may include payment-related data and/or a wide variety of VAS data. Payment-related data may include, for example, identification information for a payment account to be utilized in association with a transaction (e.g., an account number, an identifier of an account issuer, etc.), consumer identification information that may be utilized to identify or select a payment account, and/or consumer device identification information (e.g., device identifier, a mobile telephone number, etc.) that may be utilized to identify or select a payment account. VAS data may include information associated with the provision of a wide variety of VAS in association with the transaction. These VAS may be implemented by the merchant POS device 105 and/or by any number of suitable service provider computers directly or indirectly in communication with the merchant POS device 105. A wide variety of different types of VAS may be implemented as desired in various embodiments of the disclosure, and each of the VAS may be associated with information received from the consumer device 115 and/or accessed from a suitable data source on behalf of the consumer. Examples of suitable pre-transaction VAS include, but are not limited to, electronic wallet services, loyalty services, coupon redemption services, location-based mobile services, electronic receipt services, product registration services, product warranty services, coupon and/or offer issuance services, targeted advertisement services, receipt reconciliation with issuer statement services, etc. Various VAS may be invoked prior to the completion of a transaction, during the completion of the transaction, and/or following the completion of the transaction.

An example electronic wallet service, which may alternatively be implemented as a transaction processing service, may facilitate the identification of a payment account to utilize in association with a transaction, as well as the verification of a consumer's identity. A loyalty service may identify an applicable loyalty account of the consumer, such as a loyalty account with the merchant. The loyalty service may then facilitate the issuance and/or redemption of loyalty points and/or loyalty rewards in association with the transaction. A coupon redemption service may compare products being purchased (e.g., UPCs, etc.) with available coupons (e.g., coupons identified from received transaction information, coupons stored at the service provider in association with the consumer, coupons accessed from an external data source, etc.), and the coupon redemption service may identify coupons that may be redeemed. The coupon redemption service may then facilitate the communication of applied coupons to coupon issuers, and the distribution of redeemed coupon revenue to the merchant. A location-based mobile service may perform a wide variety of suitable services based upon received location information (e.g., GPS coordinates, etc.) for a consumer device. For example, a location-based mobile service may evaluate a consumer device location based upon consumer transaction processing preferences, and the location-based service may determine whether the transaction may be completed based at least in part upon the evaluation. For example, a consumer may specify that a consumer device (e.g., a mobile device of a child) can only be used at gas stations and/or grocery stores in order to complete transactions. A location-based service may utilize GPS coordinates for the consumer device to identify a merchant for a proposed transaction, and the location-based service may determine whether a transaction can be approved for the merchant. As another example of a location-based service, a consumer may request different VA services in different states and/or geographical regions. Indeed, a wide variety of different location-based services may be provided as desired.

An example electronic receipt service may generate electronic receipts for a transaction, and the electronic receipts may be delivered to any number of recipients, such as the merchant POS device 105 and/or the consumer device 115. An example product registration service may automatically complete a product registration application on behalf of the consumer and deliver the registration application to a suitable recipient, such as a manufacturer. As desired, a consumer may specify the types of products (e.g., electronics, appliances, etc.) for which product registration services will be provided. An example product warranty service may identify and store product warranty information on behalf of the consumer. Another example product warranty service may evaluate consumer preferences in order to automatically (or upon prompting) purchase an extended warranty for a purchased product. An example coupon issuance service may identify, based upon, for example, the purchased products and/or historical purchases, one or more coupons to be issued to the consumer (e.g., coupons that may be printed on the back of or otherwise associated with a receipt). Similarly, a targeted advertisement service may identify advertisements and/or promotions to be communicated to the consumer. An example receipt reconciliation service may compare a purchase amount to a subsequently obtained issuer statement (e.g., a credit card statement, a bank statement, etc.) and identify any discrepancies. In other words, an example reconciliation service may conduct an audit of the transaction on behalf of the consumer and/or the merchant.

At block 220, following the reading of data from a selected payment application, a payment application identifier may be determined. For example, an identifier included in the read data may be identified. The payment application identifier may then be compared to the SLA data, and a determination may be made at block 225 as to whether the payment application identifier is included in the SLA data. In other words, a determination may be made as to whether the selected application supports single tap functionality. If it is determined at block 225 that the selected payment application is an SLA application or an application that supports single tap functionality, then operations may continue at block 230. At block 230, a successful read of the consumer device 115 may be acknowledged, for example, by outputting a suitable indicator for presentation to the consumer. Additionally, at least a portion of the data received from the selected payment application may be communicated or provided to the merchant POS device 105. Because only a single application has been read, the data communicated to the merchant POS device 105 may be referred to as "single track" data. This "single track" data may include both payment-related information and VAS information. Operations of the method may then end following block 245.

If, however, it is determined at block 225 that the selected payment application is not an SLA application or an application that supports single tap functionality, then operations may continue at block 235. At block 235, the merchant POS reader 110 may identify and invoke an SLA application stored on the consumer device 115. For example, an application that facilitates the identification of consumer VAS information to be invoked by the merchant POS device 105 and/or at a network or cloud level may be identified and invoked. In certain embodiments, this application may include an application that has been provisioned to a secure element of the consumer device by a suitable transaction processing service provider.

At block 240, data may be collected from the invoked SLA application. In certain embodiments, the collected data may include both payment-related information and consumer VAS information. The collected payment-related information may then be ignored in favor of the payment-related information previously collected from the first selected payment application. In other embodiments, only consumer VAS information may be collected. In yet other embodiments, consumer VAS information may be selectively collected while ignoring available payment-related information.

At block 245, a successful read of the consumer device 115 may be acknowledged, for example, by outputting a suitable indicator for presentation to the consumer. Although a plurality of applications have been invoked and/or read, the consumer experience may be enhanced because the consumer only perceives a single tap of the consumer device 115 with the merchant POS reader 110. Additionally, at block 245 at least a portion of the data received from the first selected payment application and/or at least a portion of the data received from the second SLA application (e.g., VAS data, etc.) may be communicated or provided to the merchant POS device 105. Because two applications have been read, the data communicated to the merchant POS device 105 may be referred to as "dual track" or two track data. A first data track is used for payment-related data read from the first payment application, and second data track is used for VAS data read from an SLA application. Operations of the method may then end following block 245.

The method 200 may end following either block 230 or block 245.

Figure 3:
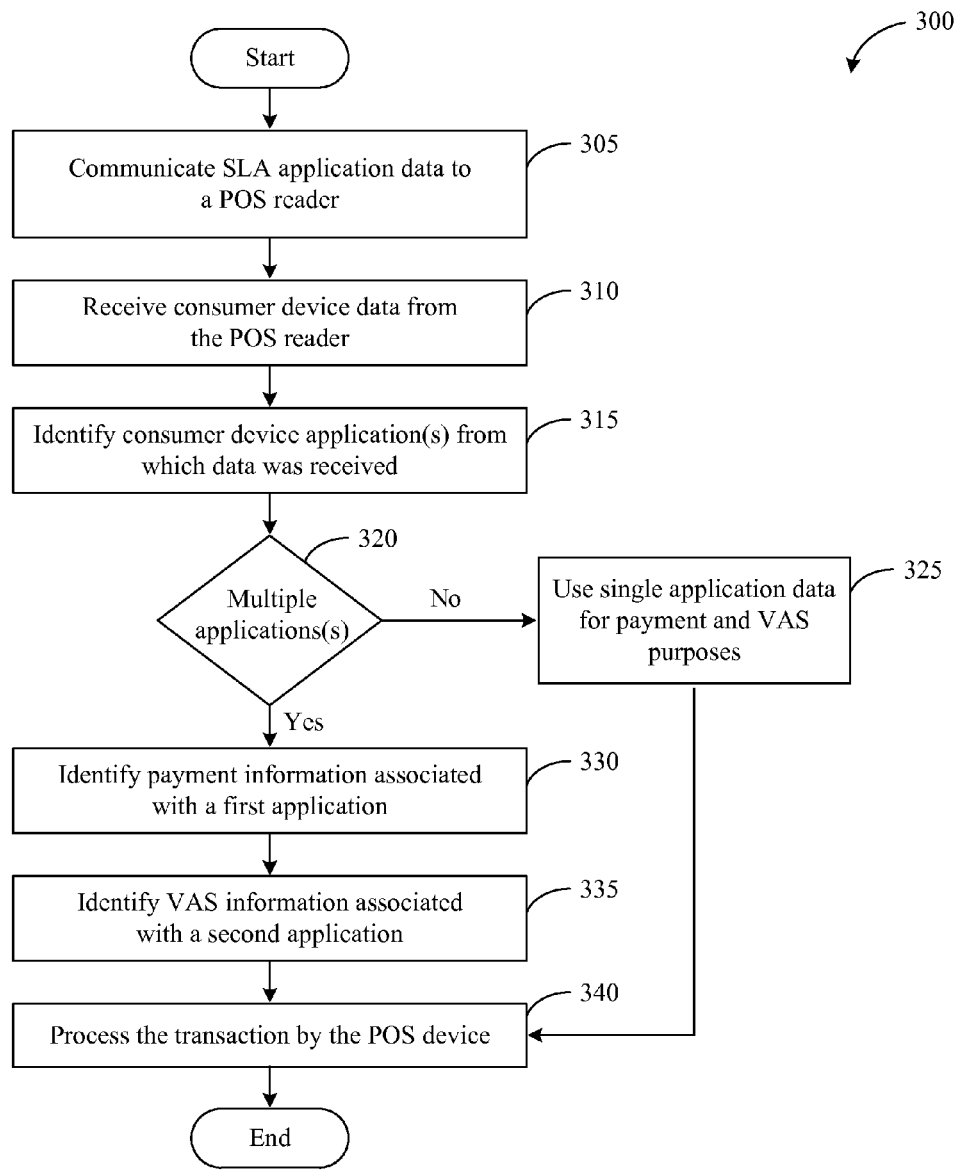
FIG. 3 illustrates a flow diagram of an example process for completing a payment transaction, according to an example embodiment of the disclosure.

FIG. 3 illustrates a flow diagram of an example method 300 for completing a payment transaction, according to an example embodiment of the disclosure. In certain embodiments, the operations of the method 300 may be performed by a suitable merchant POS device in communication with one or more POS readers, such as the merchant POS device 105 illustrated in FIG. 1. The method 300 may begin at block 305.

At block 305, information associated with one or more applications that support single tap functionality may be communicated or provided to one or more merchant POS readers, such as the merchant POS reader 110 illustrated in FIG. 1. For example, a Single-Tap List of Applications ("SLA") may be provided. The SLA data may include a wide variety of suitable information, such as names and/or identifiers of single tap applications. As a result of providing the SLA data to a merchant POS reader 110, the reader 110 may determine whether desired transaction-related information is received from a consumer device, such as the consumer device 115 illustrated in FIG. 1. As an alternative to providing the SLA data to the merchant POS reader 110, the merchant POS device 105 may maintain the SLA data, and the merchant POS device 105 may utilize the SLA data to evaluate data received from the merchant POS reader 110 in a similar manner as that described above with reference to FIG. 2.

At block 310, consumer device data may be received from one or more merchant POS readers 110. The received consumer device data may include a wide variety of transaction-related data, including but not limited to, payment account and/or other payment-related data and/or data associated with a wide variety of VAS. Additionally, the received consumer device data may include identification information associated with the one or more consumer device payment applications that were read and/or invoked by the merchant POS readers 110. At block 315, the one or more consumer device payment applications from which data was received may be identified. For example, one or more application identifiers and/or one or more tracks of received information may be identified.

At block 320, a determination may be made as to whether multiple consumer device payment applications were invoked and/or read by the merchant POS readers 110. A wide variety of suitable methods and/or techniques may be utilized to determine whether multiple payment applications were invoked and/or read. For example, a determination may be made as to whether multiple payment application identifiers are included in the data received from a merchant POS reader 110. As another example, a determination may be made as to whether multiple tracks of data are received from the merchant POS reader 110 in association with a read of the consumer device 115.

If it is determined at block 320 that multiple payment applications were not invoked and/or read, then operations may continue at block 325. At block 325, received information associated with a single invoked or read payment application may be utilized for a wide variety of payment transaction-related services, such as payment processing services and/or various VAS. Operations may then continue at block 340. If, however, it is determined at block 320 that multiple payment applications were invoked and/or read, then operations may continue at block 330. At block 330, payment-related information associated with a first payment application and/or a first track of data may be identified. The payment-related information may be utilized for payment processing services. At block 335, VAS information associated with a second application (e.g., an invoked SLA application) and/or a second track of data may be identified. The VAS information may be utilized to conduct and/or to request the performance of a wide variety of suitable VAS associated with the transaction.

At block 340, which may be reached from either block 325 or block 335, the transaction may be processed by the merchant POS device 105. A wide variety of suitable operations may be performed as desired in order to process the transaction. For example, information associated with products and/or services to be purchased, as well as payment account information and/or other transaction-related information (e.g., coupon information, etc.) read from a consumer device (e.g., a transaction-enabled mobile device, a smart card, a contactless device, etc.) may be identified. A wide variety of VAS associated with the transaction, such as the application of coupons, the award and/or redemption of loyalty rewards, etc, may then be invoked and/or requested to be conducted by a suitable service provider computer, such as a network or cloud level service provider. A proposed transaction request may also be generated output for routing and/or delivery to a suitable transaction processor, such as a payment account issuer. In the event that the transaction is authorized, a wide variety of post-transaction VAS may be invoked and/or requested following the transaction, such as receipt delivery services, product registration services, etc.

The method 300 may end following either block 325 or block 340.

The operations described and shown in the methods 200, 300, of FIGS. 2-3 may be carried out or performed in any suitable order as desired in various embodiments of the disclosure. Additionally, in certain embodiments, at least a portion of the operations may be carried out in parallel. Furthermore, in certain embodiments, less than or more than the operations described in FIGS. 2-3 may be performed.

The disclosure is described above with reference to block and flow diagrams of systems, methods, apparatuses, and/or computer program products according to example embodiments of the disclosure. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosure.

Various block and/or flow diagrams of systems, methods, apparatus, and/or computer program products according to example embodiments of the disclosure are described above. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosure.

These computer-executable program instructions may be loaded onto a special purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the disclosure may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special purpose, hardware-based computer systems that perform the specified functions, elements or steps, or combinations of special purpose hardware and computer instructions.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method for communicating with a consumer device at a point of sale (POS), the method comprising:
   establishing, by a merchant POS device, communication with the consumer device at the point of sale;
   collecting, by the merchant POS device, information from a payment application installed on the consumer device, wherein the information comprises transaction-related information and a payment application identifier associated with the payment application;
   determining, by the merchant POS device, that the payment application identifier is not included in a single-tap list of applications (SLA);
   in response to determining the payment application identifier is not included in the SLA:
      determining, by the merchant POS device, that the collected transaction-related information does not include both payment-related information and value added services (VAS) information associated with one or more VAS; and
      collecting, by the merchant POS device based at least in part upon the determination, second transaction-related information from a second payment application installed on the consumer device, the second transaction-related information comprising payment-related information or VAS information.

2. The computer-implemented method of claim 1, wherein the merchant POS device comprises at least one of a merchant POS terminal or a merchant POS reader device.

3. The computer-implemented method of claim 1, wherein determining that the collected transaction-related information does not include both payment-related information and VAS information comprises:
   determining, by the merchant POS device, an identifier of the payment application;
   comparing, by the merchant POS device, the identifier to a list of applications that support single tap functionality; and
   determining, by the merchant POS device based at least in part upon the comparison, that the collected transaction-related information does not include both payment-related information and VAS information.

4. The computer-implemented method of claim 1, further comprising:
   outputting, by the merchant POS device based at least in part upon the collection of information from the second payment application, an indication of a successful read of the consumer device.

5. A system for communicating with a consumer device at a point of sale (POS), the system comprising:
   at least one memory configured to store computer-executable instructions; and
   at least one processor configured to access the at least one memory and execute the computer-executable instructions to:
   establish communication with the consumer device at the point of sale;
   collect information from a payment application installed on the consumer device, wherein the information comprises transaction-related information and a payment application identifier associated with the payment application;
   determine that the payment application identifier is not included in a single-tap list of applications (SLA);
   in response to the determination that the payment application identifier is not included in the SLA:
      determine that the collected transaction-related information does not include both payment-related information and value added services (VAS) information associated with one or more VAS; and
      collect, based at least in part upon the determination, second transaction-related information from a second payment application installed on the consumer device, the second transaction-related information comprising payment-related information or VAS information.

6. The system of claim 5, wherein the computer-executable instructions to establish communication with the consumer device at the point of sale are initiated by the merchant POS device comprising at least one of a merchant POS terminal or a merchant POS reader device.

7. The system of claim 5, wherein computer-executable instructions to determine that the collected transaction-related information does not include both payment-related information and VAS information comprise computer-executable instructions to: determine an identifier of the payment application; compare the identifier to a list of applications that support single tap functionality; and
   determine, by the merchant POS device based at least in part upon the comparison, that the collected transaction-related information does not include both payment-related information and VAS information.

8. The system of claim 5, wherein the computer-executable instructions further comprise computer-executable instructions operable to:
   output, based at least in part upon the collection of information from the second payment application, an indication of a successful read of the consumer device.

9. A method for communicating with a consumer device at a point of sale (POS), the method comprising:
   establishing, by a merchant POS device comprising one or more processors, communication with the consumer device at the point of sale;
   collecting, by the merchant POS device, information from a payment application installed on the consumer device, wherein the information comprises transaction-related information and a payment application identifier;
   determining, by the merchant POS device, whether the payment application identifier is included in a single-tap list of applications (SLA);
   in response to determining the payment application identifier is not included in the SLA:
      determining, by the merchant POS device, that the collected transaction-related information does not include both payment-related information and value added services (VAS) information associated with one or more VAS; and collecting, by the merchant POS device based at least in part upon the determination, second transaction-related information from a second payment application installed on the consumer device, the second transaction-related information comprising payment-related information or VAS information.

10. The method of claim 9, wherein some or all of the operations are executed by the merchant POS device comprising at least one of a merchant POS terminal or a merchant POS reader device.

11. The method of claim 9, wherein determining that the collected transaction-related information does not include both payment-related information and VAS information comprises:

determining, by the merchant POS device, an identifier of the payment application;

comparing, by the merchant POS device, the identifier to a list of applications that support single tap functionality; and determining, by the merchant POS device based at least in part upon the comparison, that the collected transaction-related information does not include both payment-related information and VAS information.

12. The method of claim 9, further comprising:

outputting, by the merchant POS device based at least in part upon the collection of information from the second payment application, an indication of a successful read of the consumer device.

* * * * *